United States Patent [19]
Pusch et al.

[11] Patent Number: 4,457,966
[45] Date of Patent: Jul. 3, 1984

[54] COVER-SUBSTRATE SUPPORT MATERIAL

[75] Inventors: Gunter Pusch, Bannholzweg 12, 6903 Neckargemünd-Dilsberg, Fed. Rep. of Germany; Alexander Hoffman, Mauer; Dieter E. Aisslinger, Geisenheim; Klaus W. Pusch, Neckargemünd-Dilsberg, all of Fed. Rep. of Germany

[73] Assignee: Gunter Pusch, Neckargemünd-Dilsberg, Fed. Rep. of Germany

[21] Appl. No.: 184,789

[22] Filed: Sep. 9, 1980

[30] Foreign Application Priority Data

Sep. 8, 1979 [DE] Fed. Rep. of Germany ... 7925505[U]
Mar. 7, 1980 [DE] Fed. Rep. of Germany ....... 3008850

[51] Int. Cl.³ .............................................. B32B 3/00
[52] U.S. Cl. ................................... 428/204; 350/1.7; 350/163; 428/207; 428/209; 428/263; 428/283; 428/285; 428/457
[58] Field of Search ............... 428/204, 207, 209, 285, 428/457, 918, 283, 263; 350/1.7, 163, 164, 165, 166

[56] References Cited

U.S. PATENT DOCUMENTS

| | | | |
|---|---|---|---|
| 2,774,421 | 12/1956 | Lion | 160/238 |
| 3,138,517 | 6/1964 | Charbonneau | 428/248 |
| 3,718,528 | 2/1973 | Bergstrom | 350/1.7 |
| 4,034,129 | 7/1977 | Kittle | 350/1.7 |
| 4,296,162 | 10/1981 | Jean | 428/354 |
| 4,312,415 | 1/1982 | Fan | 350/1.7 |

FOREIGN PATENT DOCUMENTS 766853 1/1957 United Kingdom .
915518 1/1963 United Kingdom .

*Primary Examiner*—James J. Bell
*Attorney, Agent, or Firm*—Michael N. Meller

[57] ABSTRACT

A cover-substrate support material is provided with a layer reflecting thermal radiation preferably between 5 and 25 micron wavelength and there is deposited thereon a protective layer comprising arbitrarily adjustable absorption bands in the region from 400 to 900 nm wavelengths and extensively transparent in the reflecting region of the thermally reflecting layer.

8 Claims, 1 Drawing Figure

U.S. Patent
Jul. 3, 1984
4,457,966
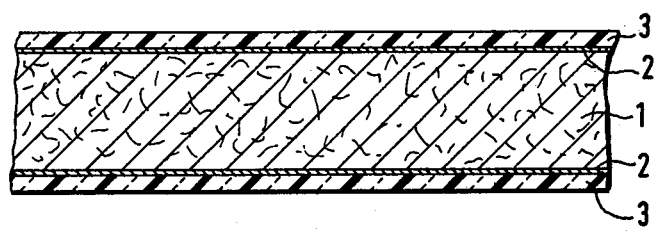

COVER-SUBSTRATE SUPPORT MATERIAL

The invention relates to a length of material consisting of a coated support-material of fibers, foils or similar, for the manufacture of insulating shades, blinds or window coverings.

The material for window shades, blinds or similar window coverings is designed depending on the light transmission and esthetic considerations, and as a rule, it is marketed only regarding these properties, and finally it is used as such in a great variety.

The length of material consisting of a coated support-material of fibers, foils or the like used in the manufacture of insulating shades, blinds or similar window coverings finds its application not only to prevent light transmission, but also represents a highly effective substance, which has become highly important recently, by means of which the heat insulating properties of windows can be substantially improved.

Materials made from coated cloth or paper or another support are known. These materials are more less light-tight, in conformity with their objective. These materials however are not suited for thermal insulation because the surfaces are gray or black in the infrared region, that is, they are highly absorbent, and are not specular in the thermal infrared range which is important for insulation. Both sides are designed for purely esthetic reasons.

Materials are known and described in the literature, which are composed of metallized textiles, fleeces and foils. To improve wearability, the thin metal layer was successfully enclosed in foils, or metallized foils were bonded on other supports. These materials represented progress where it was desired to prevent for instance solar irradiation into residential or working rooms, or the heating resulting therefrom. However the solutions described in the literature do not relate to insulation in the thermal and therefore invisible region of the infrared in the spectrum. The generalized application of the known foils was restricted by the uniform metallic gloss—which increases the effectiveness for incident sunlight—because interfering with the esthetics.

Furthermore materials have been developed which consisted of textiles on the side facing into the room and so selected as to impart a homey feeling to the room. Because of their reflectively and emissivity behavior, these materials however fail to prevent the cold mists on windows known to the expert.

SUMMARY OF THE INVENTION

It is the object of the present invention to provide a length-of-material for the manufacture of insulating shades, blinds or similar window coverings of the initially cited kind, for which the functional symmetry is achieved and which may be provided with colored surface structures selected in esthetic manner without thereby losing the insulation.

This problem is solved by the invention in that at least one side, but more appropriately the two sides of the support material are provided with a layer specular to thermal radiation preferably between 5 and 25 micron wavelengths, and in that a protective layer comprising arbitrarily adjustable absorption bands in the wavelength region from 400 to 900 nm and extensively transparent in the reflection range of the specular layer is deposited on the specular layer.

Such a material offers the advantage that it can be coated or printed with colored patterns corresponding to the esthetic needs. Simultaneously however an optimal heat reflection is achieved on one or both sides of the insulating shade, the blind or similar window coverings being provided with the specular layer, whereby on one hand an extremely favorable radiation protection is obtained against solar irradiation, and on the other hand the formation of the so called cold mist at the window is prevented, and in winter the heat radiation otherwise passing through the window can be retained.

The implementation of the invention provides that the front and back sides are adapted in their reflectivity to the wavelength range of the particular prevailing temperature radiation.

It is furthermore possible within the sense of the invention it necessary to correspondingly hollow out in part the specular layer in the repeat on both sides, especially partly as a pattern, in order to let a relatively small part of the daylight into the room through the window covering and to permit the room residents to orient themselves without resorting to the room lighting means.

DESCRIPTION OF THE DRAWING

The invention is explained below in further detail in relation to the illustrative embodiment shown in the single drawing.

The length of support-material made from fibers or the like, shown in the drawing and used in the manufacture of insulating shades or the like, is built as follows:

Essentially the material consists of three different layers. A highly specular layer 2 reflecting in the thermal infrared region (from 5 to 25 microns) is symmetrically deposited on both sides of a textile or paper support-layer 1, which is equally smooth and symmetrical on both sides. The choice of the support-material is not essential to the present invention. The function of support 1 is only mechanical, not thermally insulating.

A colored layer 3 is in turn deposited in functional symmetry on both sides of the specular layer 2, covering all or part of the surface, in monochromic or polychromic manner. The layer 3 is such that the functionally symmetric reflection of layer 2 is not eliminated in the thermal infrared region, but that there is arbitrary absorption in the 400 to 900 nm wavelength range to achieve a visual colored effect.

This effect is obtained by a corresponding selection of chrominance carriers or binders and by the geometric size of layer thickness and pigment dimension. Known infrared-transmitting plastics may be used as binder materials, for instance specially formulated polyethylene or isomerized rubber (cyclo-rubber). The size of the pigments embedded in the binder layer and the thickness of the binder layer, that is, the maximum number of plies and pigments in this layer one above the other is so selected that, according to Mie's scattering law for radiation in the optical range, diffuse scattering results, with adsorption bands corresponding to the coloration determined by the pigments and a directed scattering of the infrared radiation in the infrared radiation range. That is, pigments are selected with a size distribution such as to be relatively larger than the wavelength of the radiation in the optical range and relatively small compared to the wavelength of the infrared radiation range. Furthermore, the layer thickness is selected as thin as possible so that where feasible merely two plies of pigments will be present in the layer.

As regards coloration, the two sides need not be symmetrical. Visual coloration in no criterion for the function of the length of material used in manufacture of insulating shades or the like, rather than invention opens up another degree of freedom for artistry, without restriction on the basic function.

As regards coloration, use is made of the effect that cloths reflect, absorb and transmit different spectrum wavelengths. The invention represents preferably a symmetric screening in the thermal infrared range, lacking the otherwise monotonous, esthetically unsatisfactory metallic-lustrous surfaces.

In the invention, one embodiment of the material takes into account that the spectral distribution of a gray-body radiator is strongly dependent on its temperature, by optimizing the front and possibly the back side for the particular pertinent spectral range.

The instant invention has been described and illustrated in examples with reference to certain preferred embodiments with the first of these the best mode. Variations and modifications will be apparent to the skilled worker in the art and without departing from the principles of this invention. All the modifications and variations of these principles are intended to be within the scope of the invention as set forth in the ensuing claims.

We claim:

1. Cover-substrate material provided with a layer reflecting thermal radiation preferably between 5 and 25 micron wavelength, and deposited thereon a protective thermoplastic binder layer with chrominance carriers dispersed therein to provide arbitrarily adjustable absorption bands in the region from 400 to 900 nm wavelength and extensively transparent in the reflecting region of the thermally reflecting layer, but opaque to visible light.

2. Cover-substrate support material as in claim 1, wherein both sides are provided with the reflecting layer and with the protective layer deposited thereon.

3. Cover-substrate support material as in claim 1 in the form of an insulating shade.

4. Cover-substrate support material as in claim 1 in the form of a blind.

5. Cover-substrate support material as in claim 1, wherein the reflectivity of the thermal radiation reflecting layer is adapted to the wavelength range of the particular prevailing gray-body radiation.

6. Cover-substrate support material as in claim 2, wherein the reflectivity of the thermal radiation reflecting layer is adapted to the wavelength range of the particular prevailing gray-body radiation.

7. Cover-substrate support material as in claim 1, wherein the thermal radiation reflecting layer with the protective decorative layer thereon is applied in a pattern on said substrate.

8. Cover-substrate support material as in claim 7, wherein the pattern applied is three-dimensional.

* * * * *